Jan. 6, 1970    N. W. VAN HUSEN, JR    3,488,236
METHOD AND APPARATUS FOR HEAT TREATING A METALLIC WORKPIECE
Filed Dec. 22, 1966    7 Sheets-Sheet 1
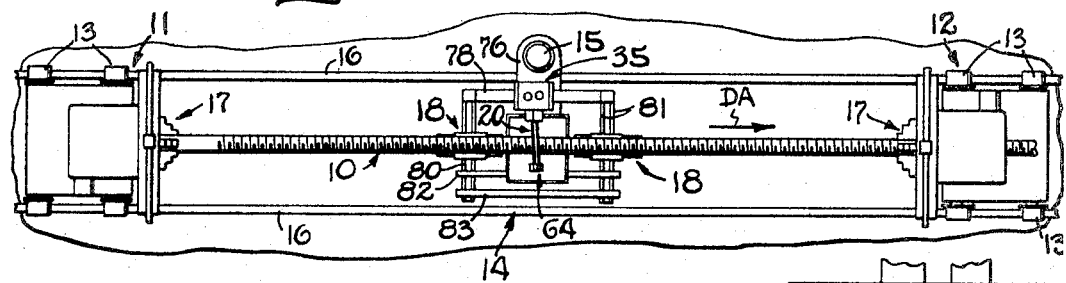
INVENTOR
NORMAN W. VAN HUSEN, JR.
by Wolfe, Hubbard, Voit & Osann
ATTORNEYS

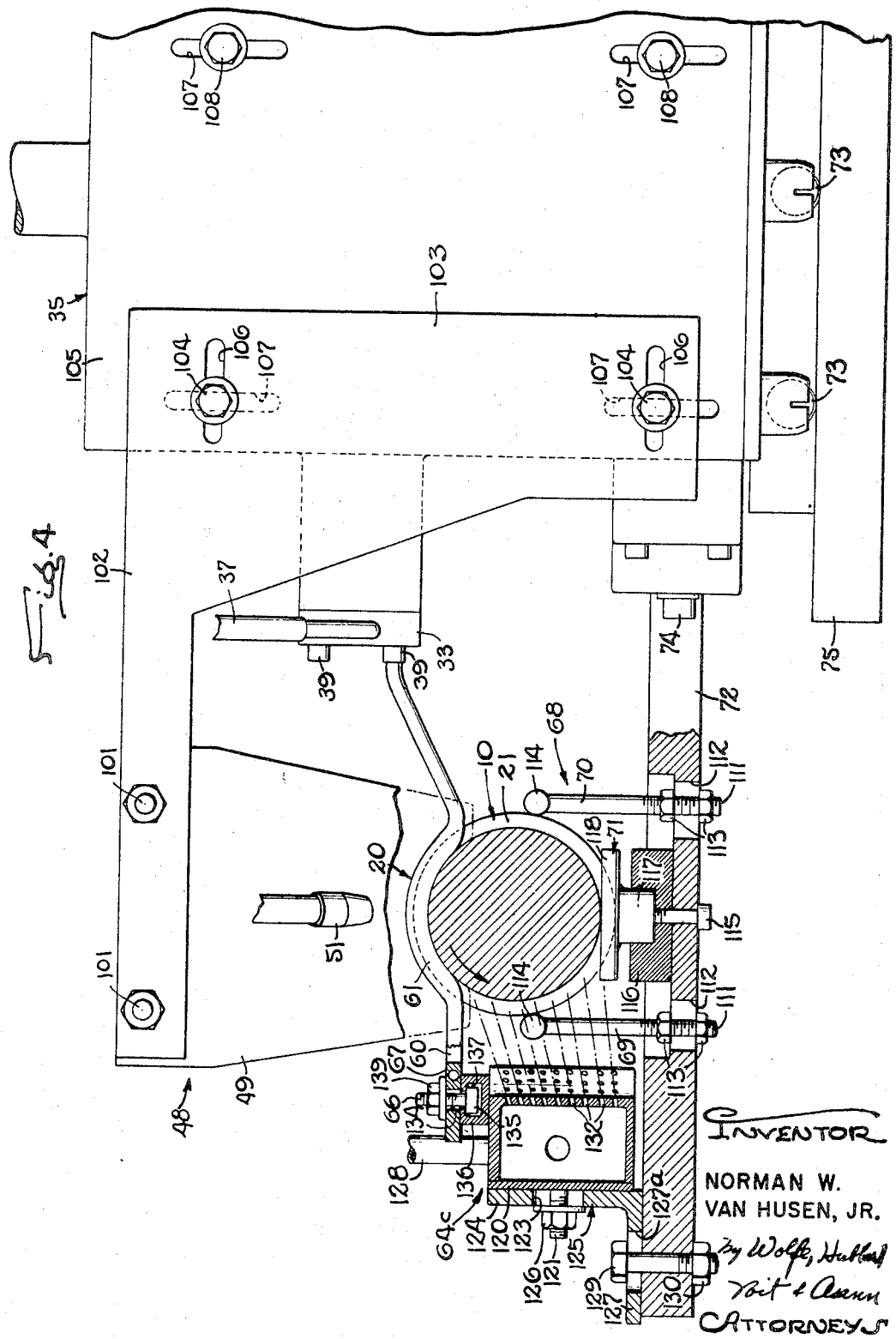

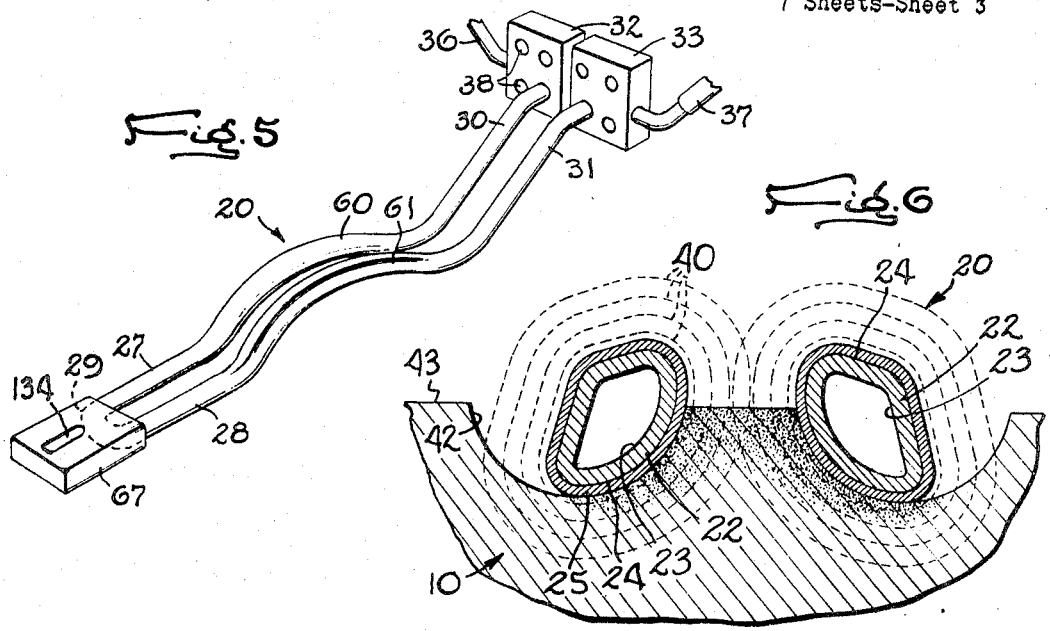
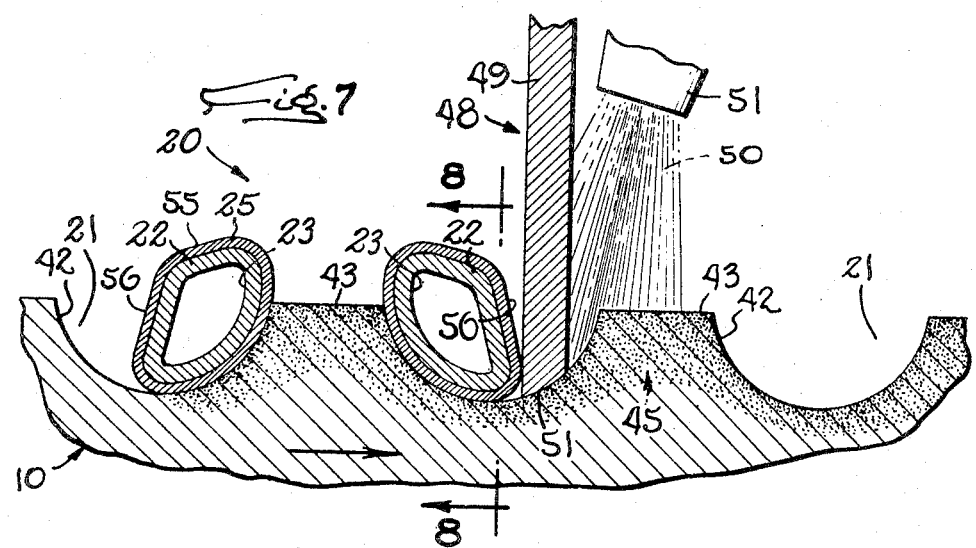
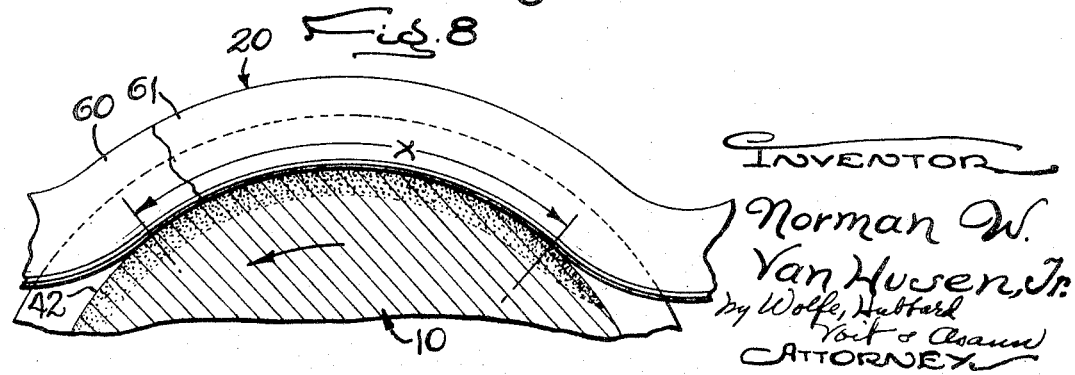

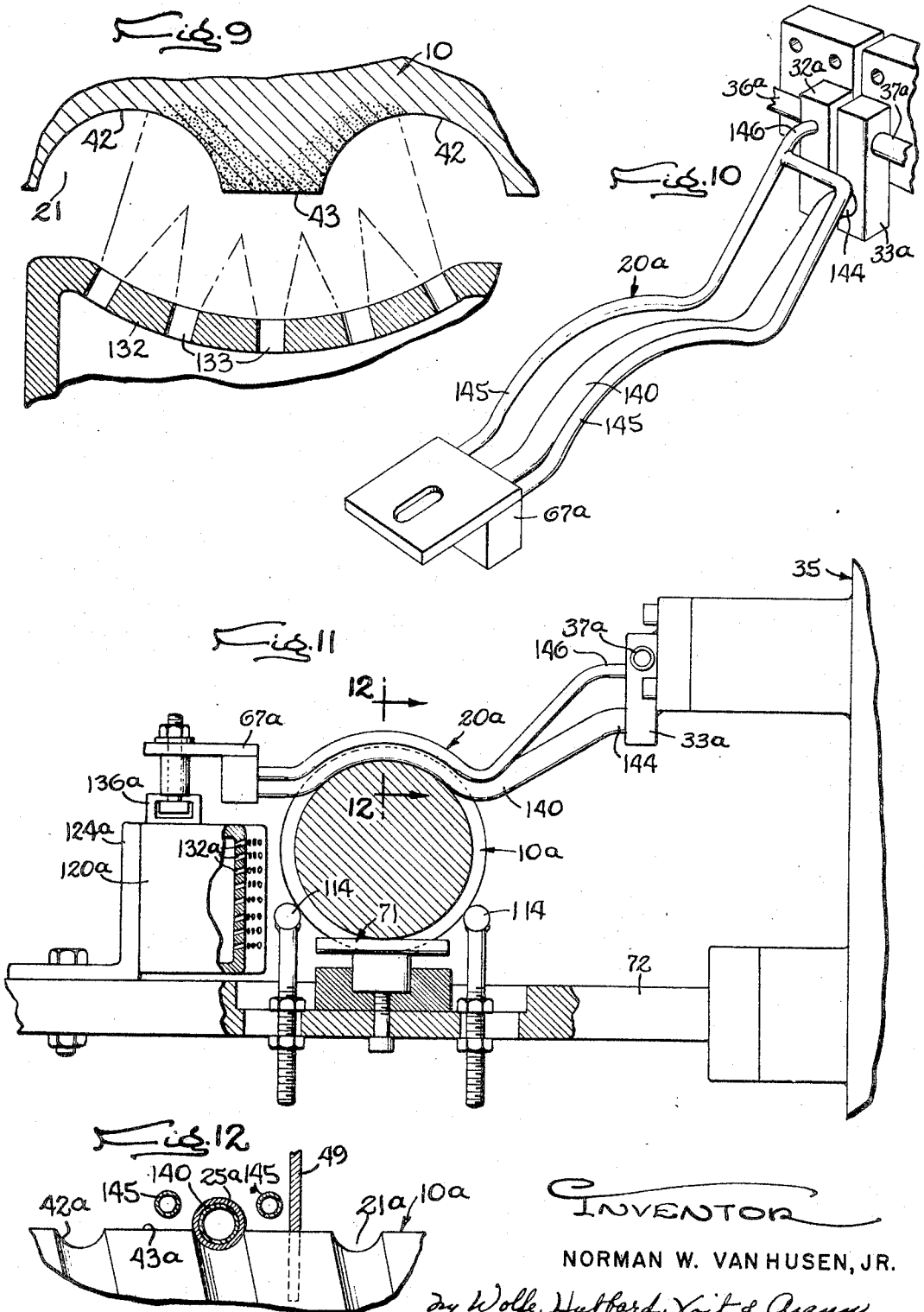

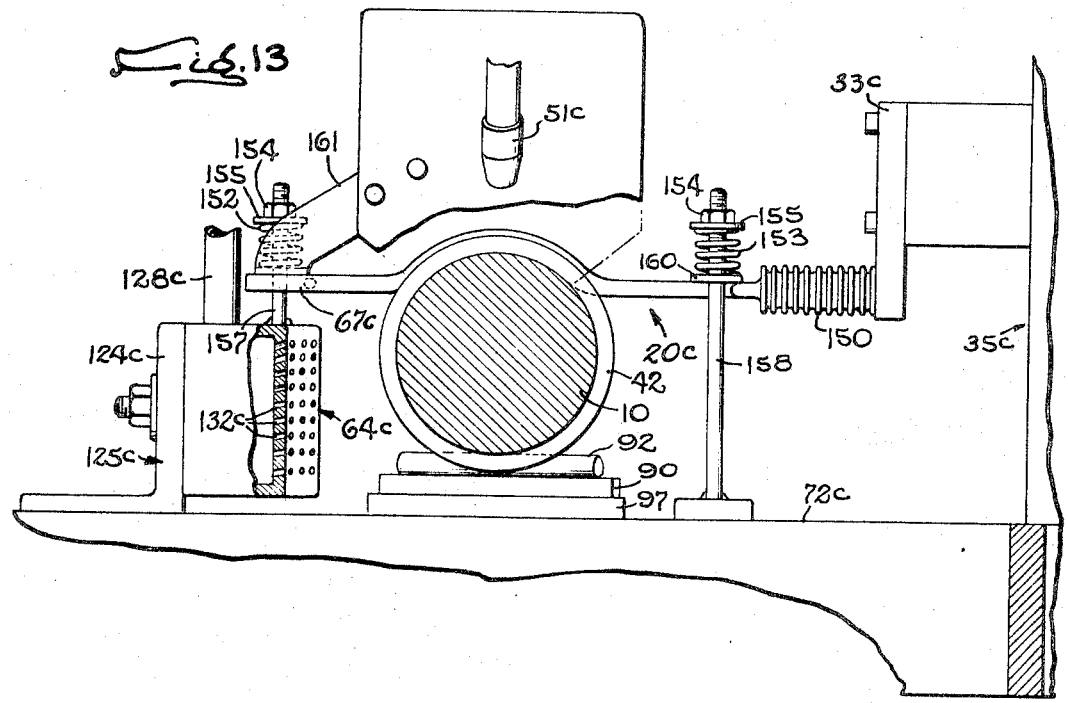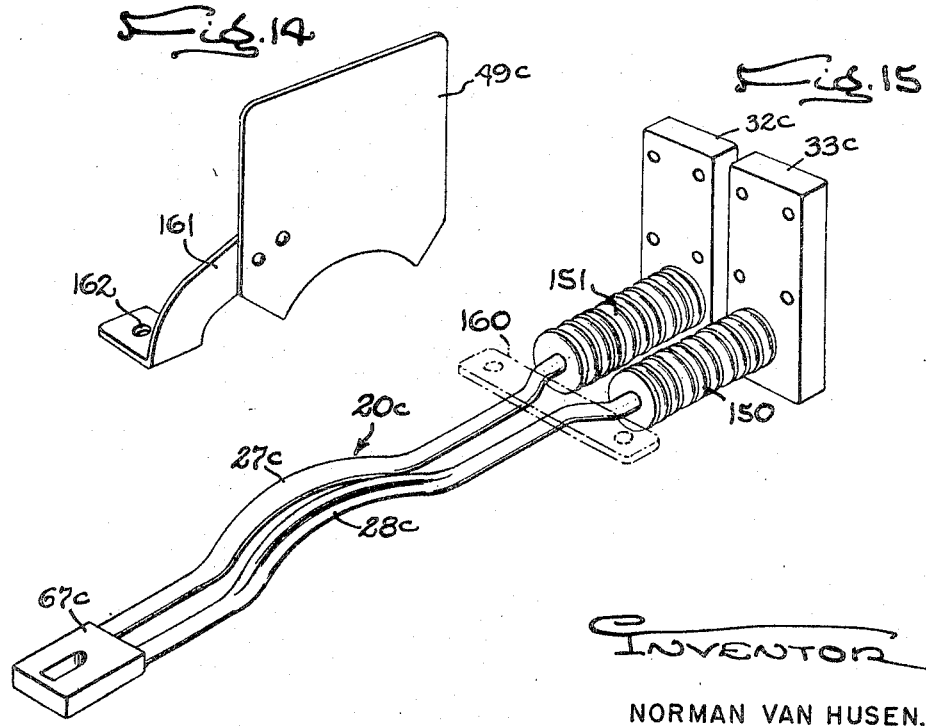

Jan. 6, 1970  N. W. VAN HUSEN, JR  3,488,236
METHOD AND APPARATUS FOR HEAT TREATING A METALLIC WORKPIECE
Filed Dec. 22, 1966  7 Sheets-Sheet 6

INVENTOR
NORMAN W. VAN HUSEN, JR.
by Wolfe, Hubbard, Voit & Osann
ATTORNEY

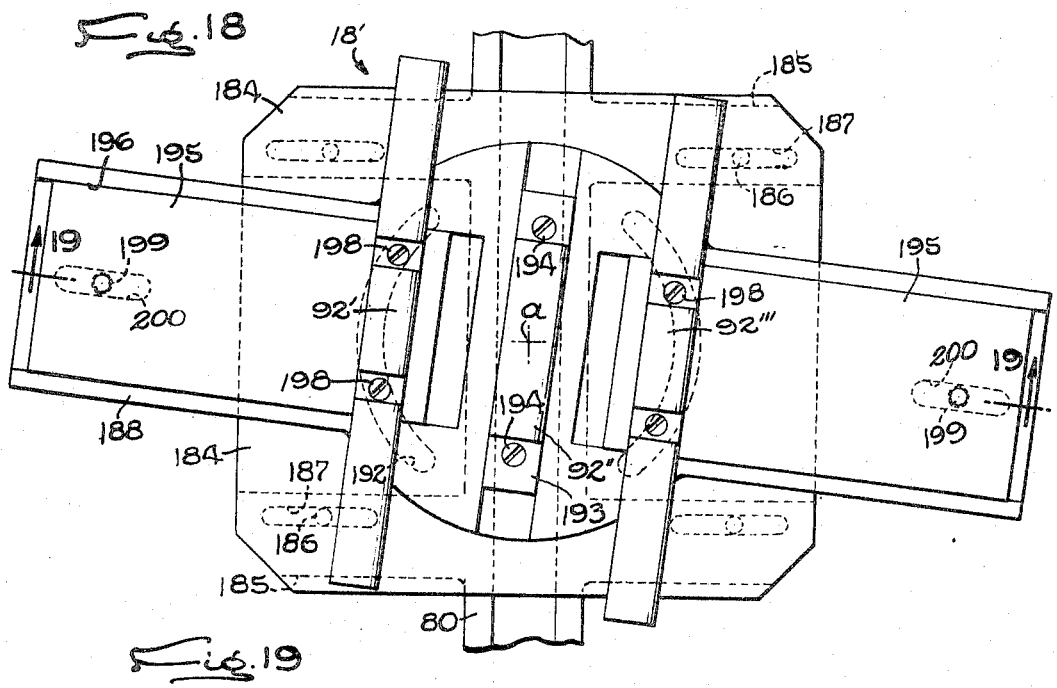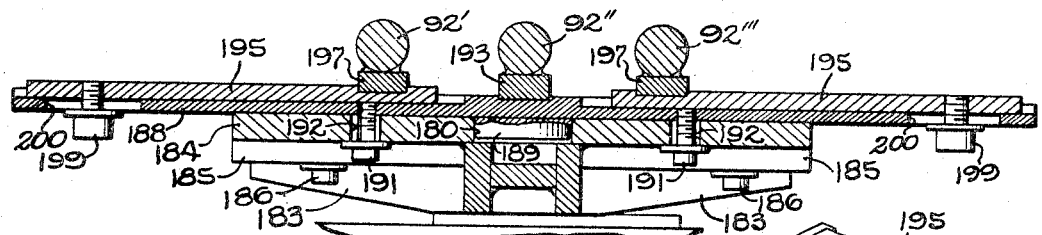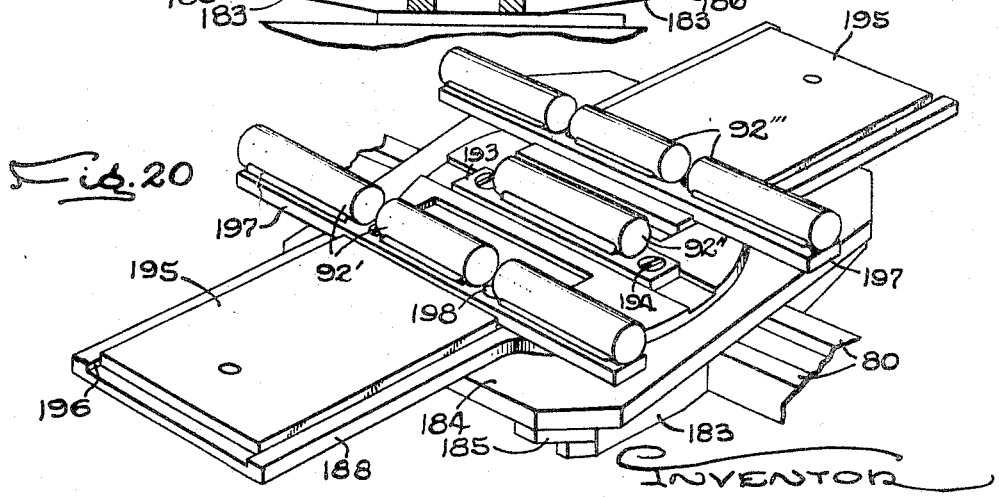

United States Patent Office 3,488,236
Patented Jan. 6, 1970

3,488,236
METHOD AND APPARATUS FOR HEAT TREATING A METALLIC WORKPIECE
Norman W. Van Husen, Jr., Southfield, Mich., assignor to Beaver Precision Products, Inc., Clawson, Mich., a corporation of Delaware
Filed Dec. 22, 1966, Ser. No. 603,843
Int. Cl. H05b 5/00
U.S. Cl. 148—150
14 Claims

ABSTRACT OF THE DISCLOSURE

A method and apparatus including an inductor element for heat treating workpieces, such as a lead screw, to produce a comparatively uniform hardening of the surface and to reduce the growth of the workpiece to a degree requiring little or no finishing following the heat treatment.

This invention relates to a method of and apparatus for induction heating of surfaces of a metallic workpiece.

The present invention is particularly directed to induction heating and surface hardening of a wear surface of a workpiece having a continuous groove formed in the peripheral surface of the workpiece. One common form of such a workpiece is a lead screw having a continuous spiral groove with wear surfaces for engagement with a nut. With relatively long lead screws, a long wear surface in the groove must receive a uniform pattern and depth of hardening without experiencing a distortion or objectionable growth of the lead screw which would necessitate a considerable grinding or dressing to return the lead screw to acceptable dimensions. With lead screws, the growth caused by heating tends to be cumulative and, hence, a long length aggravates the growth experienced. Moreover, very long lead screws tend to sag between supports and may have eccentricities therein making it difficult to achieve a pattern of hardening.

The primary object of the present invention is to achieve a relatively uniform pattern of surface heating over a continuous surface of a workpiece having a continuous groove even though the workpiece may have variations in size, eccentricities and an extremely long length.

Another object of the invention is to achieve a uniform pattern of surface heating by laying a coated induction element in a spiral groove of a workpiece and holding the coating in engagement with the surface in the spiral groove to follow any deviations in configuration of the workpiece.

The invention also resides in apparatus for threading an inductor element through a spiral groove in a workpiece and maintaining a fixed relationship of the inductor element and the surface of the workpiece even though the latter varies in dimension and tends to float as it is advanced relative to the inductor.

The invention also resides in a construction of an inductor element which is adapted to be threaded into a spiral groove of a workpiece and which has an inner electrical conductor with an insulating coating thereon for maintaining a constant predetermined special relationship between the internal electrical conductor and the surface of the workpiece.

The invention also resides in novel structural features of the apparatus for carrying out the foregoing objectives.

Other objects and advantages of the invention will become apparent from the following detailed description taken in connection wtih the accompanying drawings, in which FIGURE 1 is a fragmentary plan view of apparatus for laying an inductive element in the spiral groove of a workpiece and constructed in accordance with the preferred embodiment of the invention.

FIG. 2 is an enlarged elevational view showing a heat treating station with a workpiece therein.

FIG. 3 is an enlarged fragmentary view of a plate carrying bars constituting a nut for a lead screw.

FIG. 4 is a sectional view taken through the heat treating station showing the inductor element and quenching apparatus.

FIG. 5 illustrates one form of an inductor element for carrying out the invention.

FIG. 6 is a fragmentary cross-sectional view showing the inductor element of FIG. 5 disposed in succeeding turns of a spiral groove.

FIG. 7 is a fragmentary cross-sectional view illustrating a protective baffle and spray nozzle for cooling a previously heated surface trailing the inductor element.

FIG. 8 is a fragmentary sectional view taken along the line 8—8 in FIG. 7 and in the direction of the arrows showing the extent of wrap around engagement of the inductor element with the lead screws.

FIG. 9 is an enlarged fragmentary cross-sectional view showing the quenching of a peripheral surface of a lead screw immediately after inductive heating.

FIG. 10 illustrates another embodiment of the invention wherein a single inductor element is employed.

FIG. 11 is a sectional view taken through the workpiece and showing the mounting of the inductor element of FIG. 10.

FIG. 12 is a sectional view taken along the line 12—12 in FIG. 11 in the direction of the arrows and showing the relationship of a single inductor of FIG. 10 as related to the workpieces.

FIG. 13 is a sectional view taken through a workpiece showing still another embodiment of the invention wherein an inductor element is biased into the spiral groove and is connected by means of bellows to a transformer.

FIG. 14 is a perspective view of a protective shield for the quenching fluid employed in the embodiment of the invention of FIG. 13.

FIG. 15 is a perspective view of the inductor element employed in FIG. 13.

FIG. 18 is a view similar to FIG. 3 but shows a modified form of the invention.

FIG. 19 is a fragmentary sectional view taken along the line 19—19 in FIG. 18.

FIG. 20 is a fragmentary perspective view of the modified form.

Figure 16:
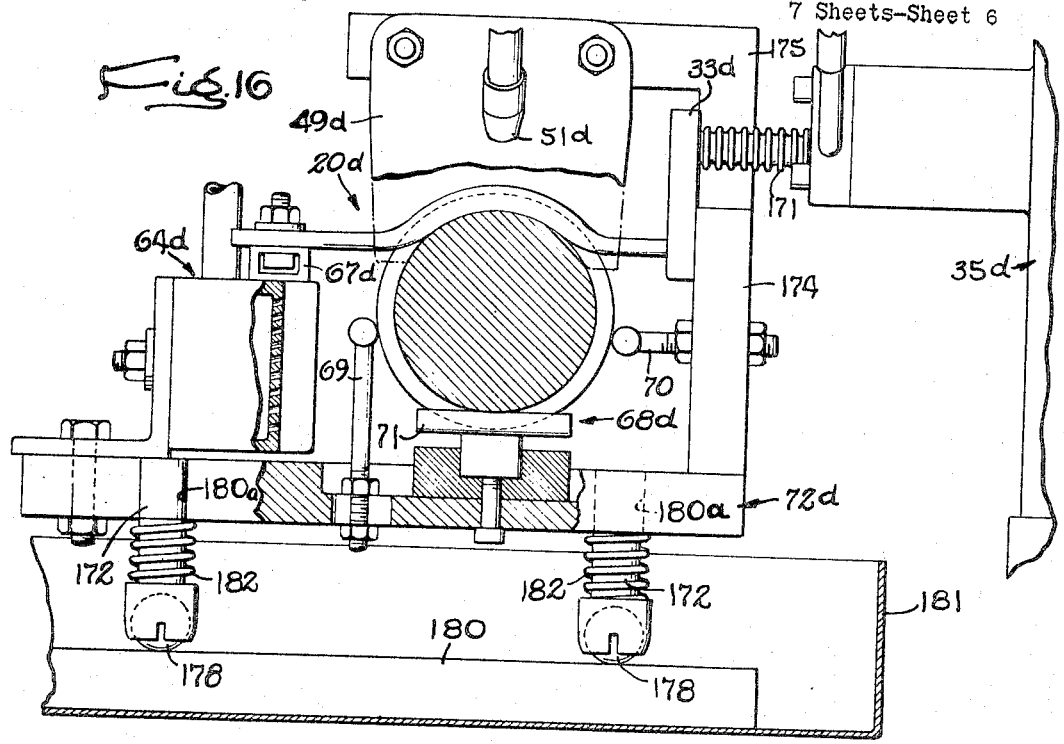
FIGS. 16 and 17 are further embodiments of the invention wherein the inductor element and the transformer are detached from each other to permit individual movement of the inductor element relative to the transformer.

As shown in the drawings for purposes of illustration, the invention is embodied in apparatus for heat treating a workpiece in the form of a lead screw 10 suitably supported at spaced points by carriages 11 and 12. Between the carriages is an inductive heat treating and surface hardening station 14 at which the peripheral surface of the lead screw is heated and quenched to obtain a hardened surface on the lead screw. Herein, the heat treating station is stationary and located at a fixed support post 15 while the carriage moves axially of the screw in the direction of arrow DA. When transporting the lead screw, a series of railroad wheels 13 on the carriages roll along opposed parallel railroad tracks 16 of a narrow gauge. It is to be understood that the movement of the lead screw 10 through the stationary heat treating station 14 is a relative movement and that, with appropriate modifications, the station 14 could be translated relative to a stationary lead screw 10.

As the carriages 11 and 12 move in the axial direction, the screw 10 is being turned by a motor-driven chuck 17 carried by at least one of the carriages. The chucks are preferably hollow at their respective centers so that the lead screw may be gripped by the chuck at points intermediate the ends of the lead screw which, then, may project outwardly of the respective carriages. As the lead screw turns and is carried in axial direction by the carriages, it is threaded through spaced nut members 18 in a platform 19 secured to the floor and is moved past an electrical inductor element 20 for heating by induction a helical groove 21 in the screw.

The apparatus of the present invention is particularly advantageous in handling very long lead screws which are often fifty or more feet in length. With such long lengths of lead screws, a sag may occur in the long unsupported span of a lead screw. Such sagging causes surfaces on the lead screw to be displaced from a true concentric relationship with a straight line axis through the lead screw and such a non-concentric or eccentric relationship is defined as an "eccentricity." Additionally, the heating of a surface metallic lead screw to the high temperatures necessary for surface hardening often results in permanent expansion, i.e., growth of the lead screw. The growth tends to be cumulative so that relatively acceptable amounts of growth over short lengths of lead screws may total an objectionable growth over longer lengths of lead screws. Even with short lengths of lead screw, the pitch distance between adjacent threads may be close to the acceptable tolerance limit, and, therefore, any appreciable growth may cause the pitch distance to enlarge and to become outside of the tolerance limits. If objectionable growth is experienced, the lead screw must be dressed to size by grinding or other operations which may be inordinately expensive and which may remove too much hardened surface at some areas.

The present invention contemplates the provision of a novel method and apparatus for heat treating workpieces, such as the lead screw 10, so as to produce a comparatively uniform hardening of the surface and also to reduce the growth of the workpiece to a degree where little or no finishing is required after heat treatment. This is achieved by laying the induction element 20 in the groove of the workpiece and threading the latter past the induction element. Preferably, the induction element extends around only a portion of one convolution of the groove. With this arrangement, the portion of the workpiece being heated can be controlled accurately to produce uniform hardening and, moreover, there is very little growth of the workpiece since only a small portion is heated at any given time.

The invention also resides in the novel inductor element 20 in which an electrical conductor 22 is coated with an outer insulating layer 25 of a predetermined thickness so that when the inductor element is placed against the workpiece the electrical conductor 22 is maintained at a predetermined and constant distance from the curved surface of the groove. Herein, the electrical conductor 22 is in the form of copper tubing or conduit (FIG. 6) with a hollow interior 23 through which flows a cooling medium such as water. The outer peripheral surface 24 of the copper conductor 22 preferably is coated with an insulating coating 25 of ceramic material which is of a uniform, and, predetermined thickness. In carrying out the present invention, other suitable materials could be employed in lieu of the ceramic material. The coating 25 does not wear appreciably and functions to maintain the usual, but now filled "air gap" between the conductor and the surface of the lead screw 10. Preferably, the inductor element 20 is laid in the spiral groove 21 at the upper portion of a convolution (FIGS. 4–6); and, as the screw turns and moves axially, the inductor element is threaded in the spiral groove in the manner of a nut.

The inductor element 20 shown in FIG. 5 is U-shaped with a pair of spaced and identical legs 27 and 28 (FIG. 5) which are joined together by a centrally located and an integral curved portion 29. Thus, the inductor legs are joined to form a continuous inductor element 20 from their respective non-joined, end portions 30 and 31. The end portions are suitably secured to terminal blocks 32 and 33, respectively (FIG. 5), which are electrically connected to a high frequency transformer 35 (FIGS. 4 and 5). The terminal blocks are ported and connected to an inlet hose 36 and an outlet hose 37, respectively, for porting a cooling medium such as water through the terminal blocks and the bore 23 of the inductor element 20. A plurality of openings 38 extend through each of the terminals to receive threaded cap screws 39 (FIG. 4) for fastening the respective terminals to the transformer 35.

The transformer 35 may be one of several commercially available types and produces any one of several suitable high frequencies, such as 500,000 cycles per second. To afford the inductive heating, the impedance of the transformer is matched with the impedance of lead screw by affording an appropriate length of conductor element 20 and thickness of insulating coating 25. In order to accommodate a large number of diameters of lead screws, the apparatus may include a set of inductor elements each of a different diameter and length to aid in affording appropriate electrical matching impedances with changes in workpieces. The high frequency current passing from the transformer and through the copper conduit 22 generates electromagnetic forces shown as lines of force 40 extending outwardly from the inductor element 20 (FIG. 6) and following the general shape thereof as illustrated by the dotted lines in FIG. 6. The rate and strength of the induction heating by electromagnetic forces follows the lines of force 40 entering the lead screw 10 thereby determining the pattern and depth of heating. The lines of force are shown in FIG. 6 entering a lead screw of which the axial cross-section of adjacent convolutions includes semi-circular, cross-sectional surfaces 42 interconnected by land surfaces 43. These semi-circular, cross-sectional surfaces are particularly adapted for use with a ball nut in which a series of sized balls roll on the semi-circular cross-sectional surfaces 42 which must be hardened to resist wear. A desired depth and pattern of surface heating and hardening for a lead screw 10 having a relatively small width of land 43 is shown by the dotted pattern 45 (FIG. 7).

An important aspect of the present invention is the preventing of the annealing of a previously heated portion of the lead screw by the trailing leg of the conductor element 20 as the lead screw 10 is threaded through the conductor element 20. More specifically, as seen in FIG. 7, the right most land 43, which has been previously heated, could be subjected again to sufficient heat by induction to anneal the right hand land 43, but for the presence of a heat barrier means 48 which includes a barrier shield 49 and a cooling spray 50 emanating from a nozzle 51. The barrier shield 49 is closely contoured and curved at its downward edge 51 to fit snugly within the spiral groove 21 and against the surface 42. The shield 49 and the water spray 50 prevent reheating of a land 43 to a temperature which could result in an annealing of the land 43 and the previously heated surface of the groove immediately to the right of barrier 49 in FIG. 7.

To aid in concentrating the lines of force on selected areas of the workpiece and thereby concentrate the heating at these selected areas, the induction element 20 is contoured to concentrate lines of force at surfaces 42 engaged by the coating 25. Moreover, the induction element 20 is contoured to direct lines of force away from any previously heated spiral groove surfaces 42 and land surface 43. To these ends, the conductive tubing 22 is formed with relatively flat side walls 55 and 56 (FIG. 7) which are closer to the surface being heated than would be similar surfaces on a circular tubing having an annular cross-section. Also, the flat walls of the downstream inductor leg 28 diverge from the barrier 49 and the previously heated portion of the lead screw 10 which is to the right of the barrier plate, as seen in FIG. 7. Since the lines of force 40 (FIG. 6) follow the contour of the tubing, the lines of force 40 converge on the surface engage by the coating 25 and diverge outwardly from the barrier plate. On the other hand, if the cross-section of the tubing 22 were annular, then the lines of force would be concentric rings with electromagnetic forces concentrated more heavily on the previously heated land surfaces 43.

To confine the intense heating to a narrow arcuate band or section on adjacent convolutions of the lead screw, the inductor element 20 has only limited engagement with the lead screw at bowed portions 60 and 61 which are formed intermediate the ends of the respective inductor legs 27 and 28 (FIGS. 5 and 8). As best seen in FIG. 8, the amount of actual bow affording the wrap-around engagement of the inductor element 20 with the surface 42 of the groove 21, is defined by the angle X which is less than 90° or one quarter of the circumference of the lead screw 10. The relatively small amount of wrap-around of the inductor element 20 concentrates considerably more power over a small area of the lead screw thereby affording the necessary high temperature for quenching and surface hardening without heating the entire cross-sectional thickness of the workpiece to a high temperature. Therefore, considerable economy is realized over processes which necessarily heat through the entire cross-sectional thickness of the workpiece. Moreover, the interior of the lead screw will remain soft and ductile.

In practice, the amount of growth of the lead screw 10 has been found to be very small or even negligible and it is thought that factors accounting for this very small amount of growth are (1) that the amount of metal being heated at any one instant of time is relatively small and (2) that the heated metal may be quickly quenched and lowered in temperature by a quenching medium because of the small amount of metal which has been previously heated. The quenching occurs immediately following the heating after only a slight rotary movement of the lead screw 10. More particularly, as seen in FIG. 4, a quenching manifold 64 is positioned to direct a quenching medium such as a cooling water on the heated surface of the lead screw 10 as it rotates from under the bowed portion 60 and 61 of the inductor element. The quenching manifold also serves to support one end of the inductor element 20 which has a connector 67 secured by a bolt 66 to the manifold. The opposite end of the inductor element is rigidly connected to the transformer 35 through terminal blocks 32 and 33. The quenching manifold is secured rigidly to the transformer by a horizontally extending plate 72 (FIG. 4) and fasteners 74.

Also, in accordance with the invention, the coating 25 at the bowed portions 60 and 61 of the inductor element 20 maintains continual contact with the surface 42 of the spiral groove 21 and this contact is maintained by following the contour of the workpiece even when the contour varies from normal dimensions. Preferably, the inductor element 20 is tracked in the lead screw 10 and follows any deviations in pitch and/or eccentricity in the lead screw to maintain a uniform pattern of surface hardening.

For the purpose of allowing the inductor element to follow closely the contour of the workpiece, the transformer 35 is mounted on free rolling ball bearings 73 rolling on a plate 75 (FIG. 4) and guiding or tracking means 68 is provided on the plate 72 to allow the inductor element 20 to shift and keep engagement with the lead screw. The tracking means includes a pair of upstanding posts or rods 69 and 70 for engaging opposite sides of the lead screw, and a bottom rod or key 71 secured to the plate 72 oriented at the lead angle of the groove 21 to lay in the latter. Thus, the mounting plate 72 carries both the tracking means 68 and the inductor element 20 each of which are following the contour of the lead screw 10. Therefore, with deviations in pitch of a lead screw, the transformer 35 and plate 72 slide in an axial direction along the base 75, and with eccentricities in the lead screw 10, the transformer 35 and plate 72 slide transversely along the base 75.

The movements of the transformer 35 and inductor element 20, when following deviations in the lead screw, are relatively small movements as the lead screw 10 is alined and guided by the carriages 12 and 13 and the nut members 18 for generally straight line movement through the station 14. It will be recalled that the spaced nut members 18 are supported on the platform 19 secured to the post 15. The platform 19 includes a pedestal 76 (FIG. 1) on the post 15 from which extend axially directed support arms 78 and 79 to the outer ends of which are secured transverse supports 80 and 81. The outer free ends of the supports 80 and 81 are tied together by cross braces 82 and 83 and intermediate the ends of the supports 80 and 81 are nut members 18 which coact with the lead screw 10. The nut members function in the manner of a nut threaded on the lead screw and thus assure a good orientation between the heat treating station 14 and the lead screw.

Herein, each nut member 18 comprises a plate 90 (FIG. 2) with spaced bars 92 disposed within the spiral groove 21 at spaced locations to serve in the nature of the threads or balls of a lead nut. As best seen in FIG. 3, the bars 92 are tilted to the lead angle and hence remain in the spiral groove as the workpiece turns and translates with movement of the carriages 11 and 12. In order to accommodate lead screws 10 of various sizes and pitches, the plate 90 may be adjusted angularly or substitute plates may be used. The plate 90 is held in place by fastening clamps 95 tightened by bolts 96 to clamp against a bracket plate 97 secured to the arm 80.

The apparatus preferably is made adjustable to accommodate various sizes and configurations of workpieces. For instance, the barrier shield 49 is attached by a pair of spaced fasteners 101 (FIG. 4) to an arm 102 of a bracket plate 103 adjustably mounted by bolts 104 to a plate 105 on the transformer 35. A pair of elongated horizontal slots 106 in the bracket plate 103 receive the respective shanks of bolts 104 so that the bracket plate 103 and attached shield 49 may be moved horizontally within the limits of the horizontal slots 106. Also, the barrier shield 49 may be adjusted vertically relative to the lead screw 10 to the transformer 35. More specifically, the bracket plate 103 is secured in flush engagement with a vertically slidable plate 105 having vertical slots 107 through which extends the respective shanks of the bolts 104 and 108.

To accommodate various sizes of workpieces, the glide rods 69 and 70 and the key 71 of the tracking means 68 also are mounted for adjustment on the support plate 72. For this purpose, the lower threaded shank portions 111 on the side guide rods 69 and 70 are inserted through elongated slots 112 for transaxial movement toward and away from one another. The side guide rods are held rigidly and connected to the plate 72 when a pair of opposed thread nuts 113 thereon are tightened to clamp against the plate. The upper portions of the side guide rods 69 and 70 are provided with axially extending rod portions 114 forming a T-shaped head. The axially extending rod portions 114 are brought into close and tight engagement with the opposite sides of the lead screw. Therefore, any eccentricity in the lead screw will, during turning of the lead screw 10, exert a force on a guide rod 69 or 70 to move the plate 72 and the transformer 35 in a transaxial direction.

With the change in size of workpiece and particularly with a change in pitch of a workpiece, the key 71 may be turned to another angle or replaced with a key of appropriate size and dimension. More particularly, by loosening a cap screw 115 extending upwardly through a support block 116 and threaded into a circular plug 117 attached to the bottom transversely extending rod 118, the rod 118 which is serving as the key 71, may be turned to a new angle or may be replaced. The circular plug 117 and rod 118 are tightened to engage the surface 42 of the spiral groove 21 and the key rod 118 is locked rigidly to the plate 72 by tightening the cap screw 115. So long as the pitch of the screw remains constant, the base 72 and transformer 35 remain stationary. However, with changes of pitch distance, the key 71, base 72 and attached transformer 35 are forced to move in an axial direction with the balls 73 rolling along the upper surface of the platform 75 due to the axially directed force of the lead screw pushing on the key 71.

Also, for the purpose of accommodating different diameters of workpieces, the water manifold 64 is adjustable vertically and horizontally. An outwardly extending stud 121 is secured as by welding to a rear side 120 of the quenching manifold. The stud 121 is inserted through a vertically elongated slot 123 in a vertical leg 124 of an angle bracket 125. Tightening a nut 126 on the stud 121 locks the manifold 64 against the leg 124 of the angle bracket 125 and in a vertical position above the platee 72. The inlet and outlet hoses 128 for the manifold 64 are flexible hoses permitting such adjustment and do not interfere with movement of the transformer 35 and inductor element 20.

For horizontal adjustment of the quenching manifold 64, the bracket 125 and attached manifold are mounted for sliding along the plate 72. A horizontal leg 127 on the bracket is formed with an elongated slot 127a through which extends a bolt 129 fastened by a nut 130 to the plate 72. Accordingly, the bracket leg 127 and attached quenching manifold 64 may be fastened in position located transversely of the workpiece as limited by the length of the slot 127a.

By means of the foregoing vertical and horizontal adjustments, the quenching manifold 64 may be adjusted close to the workpiece (FIG. 9) to direct the quenching water on the workpiece 10. The water exits the manifold 64 at a forward, perforated wall 132 of concave configuration, as seen in FIGS. 4 and 9. The arcuate wall 132 and its arcuate array of apertures 133 cause the water jets to converge toward the land surface 43, as illustrated in FIG. 9, and to cool the curved surfaces 42 of the spiral groove 21 immediately adjacent the land surface 43. The quenching water is directed to impinge directly and at different angles against a complex curvature to afford a good and even distribution of cooling water for promoting heat transfer.

It is also preferred that the inductor element 20 be capable of adjustment for accommodating various diameters of workpieces. For this purpose, the connector 67 on the end of the conductor element 20 is perforated by a transversely extending slot 134 (FIGS. 4 and 5). A shank of the bolt 66 extends through the slot and its bolt head 135 is captured within a channel shaped member 136 having an upwardly opening elongated groove 137 (FIGS. 2 and 4). The channel member 136 is secured as by welding to the quenching manifold 64. The connector 67 and attached inductor element 20 may be moved in an axial direction relative to the channel member and manifold 64 to position the inductor 20 against the surface 42 of groove 21. By tightening the nut 139 on the bolt, the inductor element 20 is clamped in the groove 21. The manifold nuts 126 and 130 may be loosened and the manifold repositioned, if necessary, to assure the intimate contact between the arcuate surface of the coating 25 and the surface 42 of the groove 21.

As stated previously, a set of inductor elements 20 are provided to afford matching impedances and sufficient surface contact between a given size of screw and an inductor element. When the diameter of the inductor element is about ½ inch, it is preferred to employ an inductor element 20a (FIGS. 10–12) having only a single leg and a tubing with a circular cross-section. In the further embodiments of the invention described hereinafter, the same reference characters are employed, with a suffix letter added, to designate the same or the equivalent of elements described hereinbefore. In FIGS. 10–12, the inductor element 20a has a large diameter copper tubing or conduit 140 of circular cross-section with an insulating lining 25a preferably of ceramic material. The lining 25a is of predetermined constant end thickness, such as .020 inch, and is adapted to fit snugly in the semi-circular, cross-sectional groove 21a. The lines of electromagnetic force emanating from the inductor element 20a will be in concentric circles about the conduit 140 for establishing a generally annular pattern of heated metal and thereafter quench hardened metal.

One end 144 of the inductor element 20a is connected to a terminal block 33a which is ported to receive cooling water from an inlet pipe 37a. The water enters the hollow interior of conduit 140 and flows out through terminal connector block 67a which is also ported to direct the cooling water to smaller return conduits 145 which are joined together at an outlet 146 connected to a terminal block 32a which leads to an outlet hose 36a for the cooling water. The outlet conduits 145 are also preferably made of copper or some electrical conducting material and thereby may afford a completed electrical circuit through the inductor element 20a to the transformer 35. The connector block 67a is also made of metal in order to complete the circuit. As can best be seen in FIG. 12, the return conduits 145 are uncoated and are spaced by a considerable air gap from the lead screw 10a and therefore do not cause any appreciable surface hardening of the large lands 43a separating adjacent surfaces 42a of the spiral groove 21a. Also, a barrier plate 49 may be employed together with a nozzle 51 (FIG. 12) to prevent the annealing of the previously heated and hardened portions of the spiral groove 21a. The remaining portion or the transformer 35, support 72 and other elements shown in FIG. 11 are identical to those elements shown in FIG. 4 and the description thereof will not be repeated.

Another embodiment of the invention is illustrated in FIGS. 13–15 wherein the electrical inductor element 20c is used for induction heating of the surface 42 of a spiral groove formed in the lead screw 10. Whereas, in the previously described embodiments of the invention, the transformer 35 was mounted on balls 73 to shift because of eccentricity of the workpiece or because of a change in the pitch of the lead screw 10, the transformer 35c is stationary in the embodiment of the invention shown in FIG. 13. The induction element 20c, however, is mounted for free floating movement to follow and to track any eccentricities in the workpiece and variations in the lead of the workpiece to assure uniformity of spacing between the induction conduit and the surface of the groove being hardened. To this end, the inductor element 20c is spring biased into the spiral groove and is connected through flexible bellows 150 and 151 to terminal blocks 31c and 32c connected by bolts to the transformer 35c. The bellows 150 and 151 are hollow to permit the passage of cooling water therethrough and also are electrically conductive to afford the electrical circuit from the transformer 35c through the legs 27c and 28c of the inductor element 20c. The bellows 150 and 151 are expansible and collapsible to permit axial, radial and/or tilting movement of the conductor element 20c relative to the stationary transformer 35c.

For the purpose of assuring that the inductor element 20c remains in tight engagement with the surface of the spiral groove, a pair of spaced springs 152 and 153 (FIG. 13) are held under compression by nuts and washers 154 and 155 respectively to exert a biasing force on the upper surface of a connector 67c and bar 160. The springs 152 and 153 encircle a pair of threaded studs 157 and 158 respectively. The stud 157 is fixed to the upper surface of the stationary manifold 64c and the stud 158 is fixed to a plate 72c which is stationary as contrasted to the movable plate 72, described hereinbefore.

It is also preferable to employ a barrier means in the embodiment of the invention shown in FIG. 13 to prevent the annealing of previously heated surfaces of the workpiece. Thus, a shield plate 49c is secured by an angle bracket 161 (FIG. 14) having an enlarged hole 162 to receive the vertically oriented stud 157. The shield 49c is preferably of light weight material and cooperates with a spray nozzle 51c to prevent annealing by an induction heating of an immediate and previously heated surface of the workpiece.

Because of the small mass of the inductor element 20c and shield 49c, the inductor element 20c is able to shift vertically and horizontally, as well as to tilt in a circumferential direction relative to the workpiece 10 to accommodate and deviations in the workpiece. Thus, the relatively heavy transformer and supporting plate 72 need not be shifted with shifting of the inductor element. The flexible bellows 150 and 151 are sufficiently collapsible and expandable to allow a relatively free and floating movement of the inductor element 20c. The inductor element 20c is coated with ceramic and is electrically insulated from the spring 152 and its support stud 157.

Figure 17:
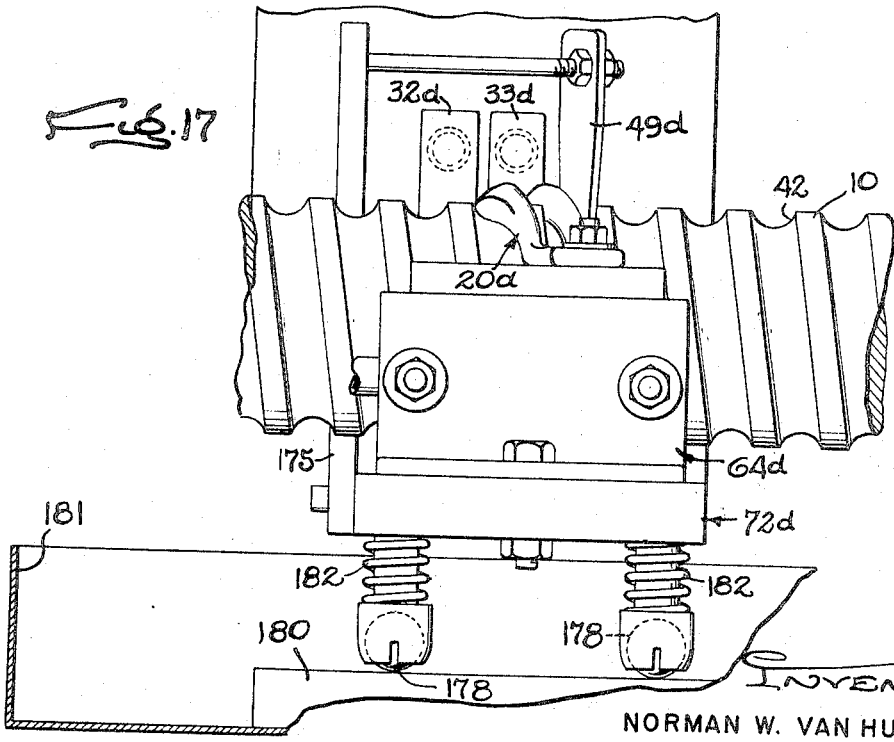

In the embodiment of the invention shown in FIGS. 16 and 17, the transformer 35 remains stationary and its large mass is isolated from concurrent movement with the conductor element 20 by means of a pair of expansible and collapsible bellows 171. Also the mounting plate 72d (FIG. 16) is detached from the transformer 35 for movement relative thereto.

The plate 72d and the inductor element 20d follow or track the surface of the groove of the lead screw and, for this purpose, a suitable tracking means 68d is connected to the plate 72d to move the supporting plate 72d axially or transaxially when following the contour of the lead screw 10. A key 71 in the spiral groove provides the axial tracking and guiding; and opposed guide rods 69 and 70 provide the transverse tracking. The guide rod 70 is secured to a vertical plate 174 (FIG. 16) rather than to the base or bottom plate 72, as previously described. The plate 174 also supports an L-shaped bracket 175 for supporting the barrier shield 49.

The inductor element 20d (FIG. 16) may be of similar configuration to that of the inductor element 20 shown in FIGS. 1-4 inclusive but, in this case, it is connected to connector terminals 32d and 33d (FIG. 16) through the collapsible and expandable bellows 171. The latter are electrically conducting and constitute electrical circuit elements between the inductor element 20d and the transformer 35. The inductor element 20d (FIG. 16) is clamped under pressure and follows the deviations of the workpiece, that is, the tracking means 68d will cause a shifting of the plate 72d since the latter is supported by the legs 172 on the balls 178 rolling on a stationary plate 180 disposed within a water receiving pan 181.

The construction illustrated in FIG. 16 also permits vertical or rotational movement of the inductor element 20d to assure the intimate contact of the coating 25 with the surface of the spiral groove. For this purpose, the legs 172 for the plate 72d are fitted in bores 180a in the support plate 72d for a sliding fit; that is, for sliding vertically in the bores 180a as its associated spring 182 is compressed or expanded.

FIGS. 18, 19 and 20 illustrate a modification in which the nut member 18' is adjustable both angularly and longitudinally to accommodate different leads and helix angles of the groove 21 in the screw 10. To this end, the bars 92', 92" and 93'" are mounted so that they may selectively be turned about the axis a (FIG. 18), shifted longitudinally of the screw 10 and shifted together and apart.

In the illustrated embodiment, the foregoing is achieved by welding wings 183 to the sides of the support 80 and by clamping a horizontal block 184 to flanges 185 on the wings by means of screws 186. The latter project through longitudinal slots 187 (FIG. 18) in the flanges 185 and are threaded into the block so that, by loosening the screws, the block may be shifted axially of the screw 10 within the limits of the length of the slots.

On top of the block 184 is an elongated horizontal plate 188 with an integral boss 189 (FIG. 19) depending from its center and projecting down into a central hole 190 in the block so that the boss defines the axis a and the plate may turn about this axis. It will be observed that the plate and hence the axis a also shift bodily with the block. The plate 188 is held in any selected angular position by screws 191 (FIG. 19) which project through arcuate slots 192 in the block and are threaded into the underside of the plate. The bar 92" is welded to a rectangular bar 193 which, in turn, is fastened to the plate 188 by screws 194.

The bars 92' and 92'" are mounted on the plate 188 so that they may be shifted sidewise toward and away from the bar 92" and thereby accommodate screws with different leads. For this purpose flat slides 195 are disposed in ways 196 (FIG. 20) formed in the upper side of the plate 188 on opposite sides of the bar 92" whereby the slides may be shifted individually lengthwise of the plate. Each of the bars 92' and 92'" is formed by three alined segments welded to a rectangular bar 197. The latter is fastened to a slide 195 by screws 198 between the segments. The longitudinal position of the slides 195 and hence the spacing of the bars 92' and 92'" from the bar 92" is held by screws 199 which project up through lengthwise slots 200 in the plate 188 and are threaded into the slides.

With the arrangement shown in FIGS. 18, 19 and 20, the plate 188 is turned about the axis a to position the bars 92', 92" and 92'" at an angle corresponding to the helix angle of the screw 10 and the slides 195 are moved in or out so that the lateral spacing of the bars is correlated to the lead of the screw. The block 184 is shifted to match the bars with the position of the groove 21 in the screw as the latter is held between the chucks 17.

From the foregoing, it will be seen that a uniform pattern of heating and surface hardening is obtained on workpieces having a groove into which may be laid a coated inductor element. The inductor element is guided and mounted to follow closely the surface of the workpiece to obtain the uniform pattern even with deviations in the workpiece from nominal dimensions. The apparatus is particularly capable of handling very long lead screws without experiencing any objectionable growth due to heating.

I claim as my invention:

1. In an apparatus for heating a surface of a spiral groove in a lead screw, the combination of, an induction heating station, carriage means for advancing said lead screw relative to said induction heating station, means for turning said lead screw as it is advanced relative to said induction heat treating station, and induction heating means at said station including an induction element adapted to be laid in said spiral groove of said groove of said lead screw and adapted to be treaded through said spiral groove as said screw is turned and advanced, said induction element having an inner electrical conduit and an outer covering of insulating material of predetermined thickness, and means supporting said element with said covering for engaging the surface of the groove thereby to maintain said electrical conduit spaced at said predetermined distance from said surface of said groove thereby affording a uniform pattern of surface heating along said spiral groove.

2. The apparatus of claim 1 including quenching means for applying a quenching medium to quench a heated surface of said lead screw.

3. The apparatus of claim 2 including tracking means for engaging the surface of said lead screw and for following movements of said lead screw, said inductor element being operatively connected to said tracking means and shiftable thereby to maintain said predetermined distance and thereby said uniform pattern of surface hardening.

4. The apparatus of claim 2 wherein said inductor element is formed with a bowed portion intermediate its sends for laying in a portion of a convolution of the screw.

5. In a machine for surface hardening a surface of a continuous groove extending in axial direction in a workpiece, the combination of, means providing a source of high frequency current, an inductor element for heating said surface and including a conductor connected electrically to said means providing the source of high frequency current, insulating means connected to conductor and adapted to engage said surface and to space said conductor at a constant and predetermined distance from said surface, means for threading said insulating means in said groove and for maintaining continuous engagement of said insulating means with said surface and means for moving said inductor element and said groove relative to one another in the axial direction with said inductor element threaded in said groove.

6. The machine of claim 5 wherein said means for threading and for maintaining continuous engagement of said insulating means with said surface includes a freely movable support and guides thereon adapted to engage opposed sides of said workpiece and spiral groove, said guides being fixed to said support to move said support and said inductor element as the contour of said workpiece exerts forces on said guides.

7. The machine of claim 5 wherein said insulating means is a coating on said conductor, said inductor element has a pair of spaced leg portions for being held in adjacent turns of the groove, means for applying a quenching medium to said workpiece, and barrier means for positioning in one of said turns of said groove and adapted to protect against reheating and annealing of a previously heated surface.

8. In a machine for surface hardening a screw having a continuous spiral groove therein, means affording a source of high frequency current, an inductor element connected electrically to said means affording said source of high frequency current for heating the surface of the screw, a bowed portion formed intermediate the ends of the inductor element for engaging only a portion of a turn of said groove of said screw, an insulating coating of predetermined and uniform thickness on bowed portion of said inductor element, clamping means for clamping said insulating coating of said inductor element against a surface in said spiral groove of said screw in order to follow the surface of said spiral groove, means mounting said inductor element for axial and transaxial movement to follow eccentricities and changes in lead of said groove and means for moving said screw in an axial direction and for turning said screw to thread said screw through said inductor element.

9. The machine of claim 8 wherein said means mounting said inductor element includes a supporting surface and rollers for rolling engagement across said supporting surface to permit a free floating movement of said inductor element.

10. The machine of claim 8 wherein said clamping means includes springs for biasing said inductor element for engagement with said lead screw.

11. The method of surface hardening a surface of a continuous spiral groove in a workpiece with an inductor element having a curved portion with an interior electrical conductor and an outer coating of insulating material thereon of a predetermined thickness, said method comprising the steps of inserting said curved portion of said inductor element in a portion of said groove with said insulating coating disposed against said surface of said spiral groove thereby to position said electrical conductor at a predetermined distance from the surface of said groove, applying a clamping pressure to hold said insulating coating against said surface of said spiral groove to maintain said electrical conductor at said predetermined distance from said surface, rotating and moving axially said workpiece relative to said inductor element to thread said inductor element through said spiral groove, and applying a quenching medium to said heated surface for continuous surface hardening of said surface of said spiral groove.

12. An inductor element for surface hardening a workpiece having a spiral groove therein, said inductor element comprising a hollow conduit formed of material capable of carrying electric current, said conduit having at least a portion of its outer surface of arcuate curvature adapted to be concentric with an arcuate curvature at a cross-section of said spiral groove, end portions on said conduit for electrical connection to a source of current, a bowed portion formed in said hollow conduit intermediate said end portions and curved to fit in a convolution of said spiral groove, an insulating coating on said hollow conduit of uniform and predetermined thickness, said coating adapted to engage said surface of said spiral groove and space said bowed portion of said conduit therefrom by a distance equal to said predetermined distance.

13. The inductor of claim 12 wherein said hollow conduit has a circular cross-section.

14. The inductor of claim 12 wherein said hollow conduit includes a pair of spaced legs having integral connection therebetween, each of said legs having a bowed portion and an insulating coating thereon, and a flat portion on the cross-section of said inductor element for concentrating lines of force at the surface of the spiral groove.

References Cited

UNITED STATES PATENTS

| | | | |
|---|---|---|---|
| 2,495,474 | 1/1950 | Phillips | 219—10.57 |
| 2,540,700 | 2/1951 | Stivin | 219—10.57 |
| 2,574,564 | 11/1951 | Högel et al. | 219—10.57 |
| 2,845,377 | 7/1958 | Seulen et al. | 148—150 |

OSCAR R. VERTIZ, Primary Examiner

H. S. MILLER, Assistant Examiner

U.S. Cl. X.R.

219—10.57, 10.59, 10.67, 10.69, 10.79